April 5, 1955     K. T. LAYMON     2,705,736
VOLTAGE DIVIDER POST FOR AN ELECTRIC BATTERY
Filed March 16, 1954
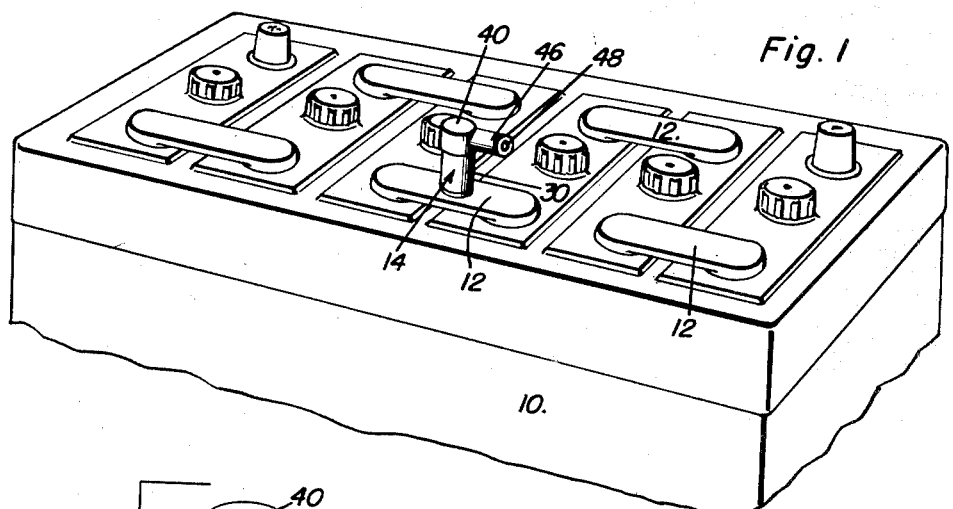
Fig. 1
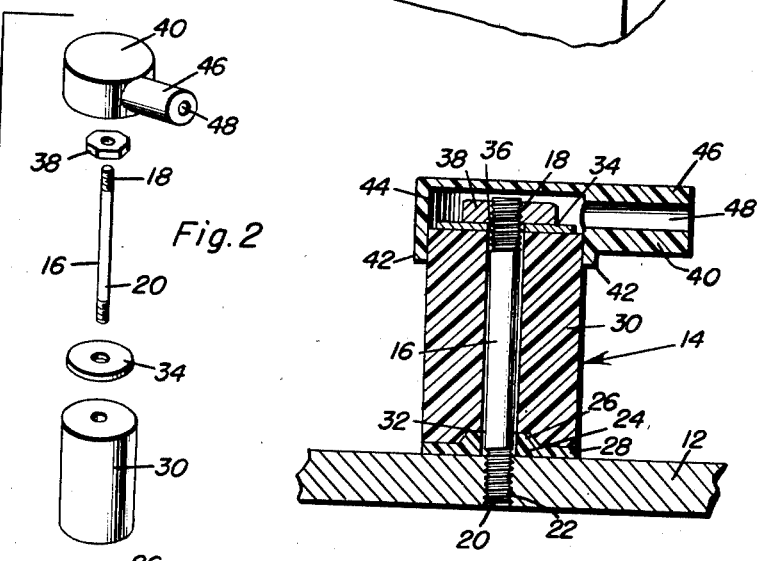
Fig. 2
Fig. 3
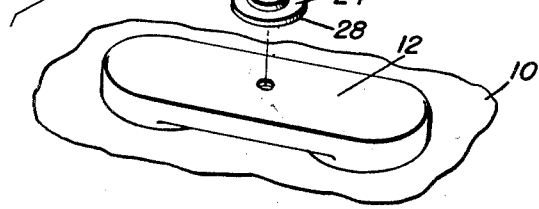
Kermit T. Laymon
*INVENTOR.*

United States Patent Office 2,705,736
Patented Apr. 5, 1955

2,705,736

VOLTAGE DIVIDER POST FOR AN ELECTRIC BATTERY

Kermit T. Laymon, La Habra, Calif.

Application March 16, 1954, Serial No. 416,501

4 Claims. (Cl. 136—135)

This invention relates to a voltage divider post adapted to be used in combination with a cell post of a storage battery for adapting the storage battery for use with automobile accessories having lower voltage capacities than the normal output of the storage battery.

Many foreign makes and models of automobiles, as well as certain American types utilize 12-volt storage batteries for use in providing electrical power to operate certain accessories of the automobile. However, certain automobile accessories are designed by their manufacturers for use with conventional 6-volt systems, as are generally used on vehicles built in the United States. Therefore, it is necessary to provide some means for providing electrical power for use with these accessories whose rated capacities are 6-volts, since connection to a 12-volt system would greatly reduce the life of these accessories. Accordingly, it is the concept of the present invention to provide means for utilizing the 12-volt storage battery to provide a 6-volt circuit for these accessories.

The device comprising the present invention includes a voltage divider post which is threadedly secured in one of the cell posts of the battery which interconnects the cells of the battery. This arrangement does not have any undue and adverse effect upon the battery since the power stored therein will be restored by the generator.

One of the advantages of the construction incorporated in the present invention is that the voltage divider post holds the electrical connectors in spaced relationship relative to the cell post to which it is connected and to other portions of the battery, thus preventing any possible leakage loss. Further, the arrangement of parts incorporated in the invention ensures an acid-free connection between the conductor and the cell post.

Still further objects and features of this invention reside in the provision of a voltage divider post that is strong and durable, simple in construction and manufacture, capable of being used with most types of storage batteries, and which is economical to produce, thereby permitting wide distribution.

These, together with the various ancillary objects and features of the invention which will become apparent as the following description proceeds, are attained by this voltage divider post, a preferred embodiment of which has been illustrated in the accompanying drawing, by way of example only, wherein:

Figure 1 is a perspective view illustrating the voltage divider post as operatively installed on a conventional 12-volt battery;

Figure 2 is an exploded perspective view of the voltage divider post; and

Figure 3 is a vertical sectional view of the voltage divider post in an enlarged scale.

With continuing reference to the accompanying drawings, wherein like reference numerals designate similar parts throughout the various views, reference numeral 10 generally designates a conventional wet cell 12-volt storage battery having a series of cell posts 12 interconnecting the various cells of the battery 10. The device comprising the present invention is generally indicated by reference numeral 14, and this voltage divider post is threadedly secured to the cell post 12 interconnecting the two centrally disposed cells so that the voltage across the voltage divider post 14 and ground will equal one-half the rated output of the battery 10.

The voltage divider post 14 includes a rod 16 which is threaded at its upper and lower ends 18 and 20, respectively, the lower end 20 being threadedly secured in an internally threaded and tapped aperture 22 in the selected cell post 12. Concentrically positioned about the rod 16 is an insulative washer 24 which has a raised central portion 26 spaced from the peripheral edge 28 of the washer 24.

Also concentrically positioned about the rod 16 is an insulative cylindrical body 30 of suitable characteristics having a central recess 32 in the lower portion thereof adapted to receive the raised portion 26 of the washer 28 so as to properly hold the body 30 in position. The body 30 is of sufficient height to extend upwardly toward the upper end 18 of the rod 16 and has positioned thereon a contact plate or disk 34 of electrically conductive material and which is centrally disposed about the rod 16 since it has a centrally disposed aperture 36 therethrough. There is threadedly secured on the upper ends 18 of the rods 16 a nut or fastener 38 which is adapted to hold a conductor between itself and the contact plate 34 in electrical contact with the rod 16. The nut 38 may be formed of an electrically conductive material.

In order to ensure an acid-free connection between the electrical conductor and the rod 16 as well as an acid-free connection between the rod 16 and the cell post 12, there is provided a cap 40 which is adapted to be positioned over the plate 34, the nut 38 and the post 16 in embracing relationship with the upper portions of the body 30. It is to be noted that after the nut 38 has been drawn down tightly holding the conductor in place, the body 30 will serve to space the conductor above the battery.

The cap 40 is preferably formed from a resilient insulative material and has lower flanged portions as at 42 which resiliently embrace the upper portions of the body 30. The flanged portions 42 are formed by means of the recess 44 in the cap 40 which opens into the bottom thereof. A projection 46 of preferably cylindrical shape is integrally formed with the cap 40 and extends outwardly therefrom. This projection 46 has an aperture 48 therethrough which communicates with the recess 44 so that a conductor may be passed therethrough and engaged about the rod 16.

In use, an operative electrical circuit through the selected cells of the battery and the ground will be formed utilizing this voltage divider post. The conductor connected to the voltage divider post will be held in spaced relationship relative to the battery so as to prevent any unnecessary leakage loss while also assuring easy access to all portions of the battery. Further, this will form an acid-free connection between the conductor and the voltage divider post.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A voltage divider post for use in combination with a cell post of a storage battery for adapting the storage battery for use with load devices having lower voltage capacities than the normal output of said storage battery comprising a vertically extending electrically conductive rod having upper and lower threaded end portions, the lower end portions being threadedly secured to said cell post, an insulative body concentrically disposed about said rod, a conductive plate overlying said body, a threaded fastener threadedly secured on said threaded upper end portion for holding said plate and said body on said rod while holding the terminal of a conductor in electrical contact with said plate and said rod, and an insulative cap positioned in overlying relationship relative to said plate, said fastener and said upper end of said rod, said cap embracing the upper portions of said body.

2. A voltage divider post for use in combination with a cell post of a storage battery for adapting the storage battery for use with load devices having lower voltage capacities than the normal output of said storage battery comprising a vertically extending electrically conductive rod having upper and lower threaded end portions, the lower end portions being threadedly secured to said cell post, an insulative washer concentrically disposed about said rod, said washer having a raised portion inwardly spaced from the peripheral edge thereof, an insulative body having a recess in the lower end thereof, said body being concentrically disposed about said rod and receiving the raised portion of said washer within said recess, a conductive plate overlying said body, a threaded fastener threadedly secured on said threaded upper end portion for holding said plate and said body on said rod while holding the terminal of a conductor in electrical contact with said plate and said rod, and an insulative cap positioned in overlying relationship relative to said plate, said fastener and said upper end of said rod, said cap embracing the upper portions of said body.

3. A voltage divider post for use in combination with a cell post of a storage battery for adapting the storage battery for use with load devices having lower voltage capacities than the normal output of said storage battery comprising a vertically extending electrically conductive rod having upper and lower threaded end portions, the lower end portions being threadedly secured to said cell post, an insulative body concentrically disposed about said rod, a conductive plate overlying said body, a threaded fastener threadedly secured on said threaded upper end portion for holding said plate and said body on said rod while holding the terminal of a conductor in electrical contact with said plate and said rod, and an insulative cap positioned in overlying relationship relative to said plate, said fastener and said upper end of said rod, said cap embracing the upper portions of said body, said cap being of flexible material and having a recess opening into the bottom thereof, a cylindrical projection attached to said cap and extending outwardly therefrom, and an aperture through said projection communicating with the recess in said cap, said aperture being adapted to receive the conductor.

4. A voltage divider post for use in combination with a cell post of a storage battery for adapting the storage battery for use with load devices having lower voltage capacities than the normal output of said storage battery comprising a vertically extending electrically conductive rod having upper and lower threaded end portions, the lower end portions being threadedly secured to said cell post, an insulative washer concentrically disposed about said rod, said washer having a raised portion inwardly spaced from the peripheral edge thereof, an insulative body having a recess in the lower end thereof, said body being concentrically disposed about said rod and receiving the raised portion of said washer within said recess, a conductive plate overlying said body, a threaded fastener threadedly secured on said threaded upper end portion for holding said plate and said body on said rod while holding the terminal of a conductor in electrical contact with said plate and said rod, and an insulative cap positioned in overlying relationship relative to said plate, said fastener and said upper end of said rod, said cap embracing the upper portions of said body, said cap being of flexible material and having a recess opening into the bottom thereof, a cylindrical projection attached to said cap and extending outwardly therefrom, and an aperture through said projection communicating with the recess in said cap, said aperture being adapted to receive the conductor.

References Cited in the file of this patent

UNITED STATES PATENTS

| | | |
|---|---|---|
| 2,235,062 | Bak | Mar. 18, 1941 |

FOREIGN PATENTS

| | | |
|---|---|---|
| 15,785 | Great Britain | of 1906 |
| 29,773 | Great Britain | of 1909 |